US007106464B1

(12) United States Patent
Brylov (10) Patent No.: US 7,106,464 B1
(45) Date of Patent: Sep. 12, 2006

(54) SCAN SYSTEM AND METHOD FOR SCANNING IMAGES TO A REMOTE LOCATION

(75) Inventor: Iouri Brylov, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 923 days.

(21) Appl. No.: 09/626,063

(22) Filed: Jul. 26, 2000

(51) Int. Cl.
*G06F 15/00* (2006.01)
*G06F 3/00* (2006.01)
*H04N 1/00* (2006.01)

(52) U.S. Cl. ............ 358/1.15; 358/403; 358/408; 358/435; 715/764; 715/769

(58) Field of Classification Search ............ 358/1.14, 358/1.15, 402, 496, 474, 497, 403, 408, 435; 345/825; 715/748, 762, 763, 764, 769
See application file for complete search history.

(56) References Cited

U.S. PATENT DOCUMENTS

| | | | |
|---|---|---|---|
| 5,911,044 A | 6/1999 | Lo et al. | |
| 5,956,160 A | 9/1999 | Watanabe | |
| 6,115,132 A * | 9/2000 | Nakatsuma et al. | 358/1.14 |
| 6,144,468 A * | 11/2000 | Watanabe | 358/496 |
| 6,194,712 B1 * | 2/2001 | Suemoto et al. | 250/234 |
| 6,373,507 B1 * | 4/2002 | Camara et al. | 345/825 |
| 6,480,304 B1 * | 11/2002 | Os et al. | 358/474 |
| 6,504,626 B1 * | 1/2003 | Shih | 358/442 |
| 6,553,431 B1 * | 4/2003 | Yamamoto et al. | 710/8 |
| 6,556,875 B1 * | 4/2003 | Nagasaka et al. | 700/19 |
| 6,567,190 B1 * | 5/2003 | Reele | 358/474 |
| 6,608,707 B1 * | 8/2003 | Han | 358/497 |
| 6,633,913 B1 * | 10/2003 | Chalstrom et al. | 709/226 |
| 6,642,943 B1 * | 11/2003 | Machida | 345/763 |
| 6,707,581 B1 * | 3/2004 | Browning | 358/473 |
| 6,833,936 B1 * | 12/2004 | Seymour | 358/473 |

FOREIGN PATENT DOCUMENTS

| | | |
|---|---|---|
| EP | 0679014 A2 | 10/1995 |
| EP | 0756414 A2 | 1/1997 |
| EP | 0969653 A2 | 1/2000 |
| TW | 313281 | 8/1997 |

OTHER PUBLICATIONS

English translation of Office Action corresponding to R.O.C. utility model patent publication No. 313281 and EP 0756414, 1 page.

* cited by examiner

*Primary Examiner*—Edward Coles
*Assistant Examiner*—Chan S. Park

(57) ABSTRACT

A scan system and method provides users the ability to quickly and efficiently transfer images from a scanner to a destination location. In particular, the scan system can be implemented as follows. The scan system includes a scanner and a transferring mechanism. The scanner generates a scanned document or image. The transferring mechanism connects to a destination location and transfers the scanned document or image to the destination location for storage. The present invention can also be viewed as providing a method for scanning documents directly to a destination location. The method operates by selecting a scanner icon and associating the icon with the destination location. The association of the icon with the destination location causes the scanner to connect to the destination location, scan a document or image using the scanner, and transfer the scanned document to the destination location for storage.

28 Claims, 7 Drawing Sheets

SCAN SYSTEM AND METHOD FOR SCANNING IMAGES TO A REMOTE LOCATION

BACKGROUND OF THE INVENTION

1. Field of the Invention

The present invention generally relates to computers and software, and more particularly, to a scan system and method for providing users the ability to quickly and efficiently transfer documents and images from a scanner to a remote location.

2. Description of Related Art

Currently, scanning multiple pages with a flatbed scanner into an application program is fairly invasive. Typically, a user must raise the lid of the scanner and place a single document page on the scanning surface, or place the document in an automatic document feeder. Then, the user must launch a scanning application, navigate through a maze of scanning options, and finally transport the resulting scanned document into a target folder. If this folder is on a remote server, the user must then first connect and log-on to the remote server before downloading the resulting scanned document.

A key difficulty with saving image documents to a server on the Internet or Intranet, is that of simplicity for novice users. Typically, the prior solution for providing web page construction of scanned documents requires the user to (1) scan the document (2) connect to a remote server; (3) log-on to the remote server; (4) manually specify the destination folder; and (5) manually transfer the document to the remote server. Needless to say, each of the previous steps is a complicated and time-consuming task for even the most experienced scanner owner.

Different problems occur with other types of image-acquiring devices. These other types of image-acquiring devices include, for example, but are not limited to, digital cameras, digital videocassette recorder equipment, and the like. The problems for digital cameras, digital video cassette recorder equipment, and the like, include requiring proper adapters and cables for connecting to a target folder on a computer system, maintaining the correct version of device software for image execution, and the like, in addition to the problems mentioned above.

Thus, a heretofore unaddressed need exists in the industry to address the aforementioned deficiencies and inadequacies.

SUMMARY OF THE INVENTION

The present invention is generally directed to a scan system and method for providing users the ability to quickly and efficiently transfer documents and images from a scanner to a remote location.

Briefly described, in architecture, the scan system can be implemented as follows. Generally, the scan system includes a scanner and a transferring mechanism. The scanner is provided to generate a scanned document or image. A transferring mechanism initiates the scanning of the document or image, connects to a destination location and transfers the scanned document or image to the destination location for storage.

The present invention can also be viewed as providing a method for scanning documents directly to a destination location. In this regard, the method can be broadly summarized by the following steps: (1) selecting a scanner icon; (2) accociatng the icon with the destination location; (3) scanning a document or image using a scanner; and (4) automatically transferring the scanned document to the destination location for storage.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE PREFERRED EMBODIMENT

The present invention will now be described in detail with specific reference to the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

The present invention provides the functionality of a single drag and drop solution that enables a user to initiate scanning a document on a scanner, connecting to a remote location and saving the scanned document in a folder with just one move of the mouse.

Figure 1:
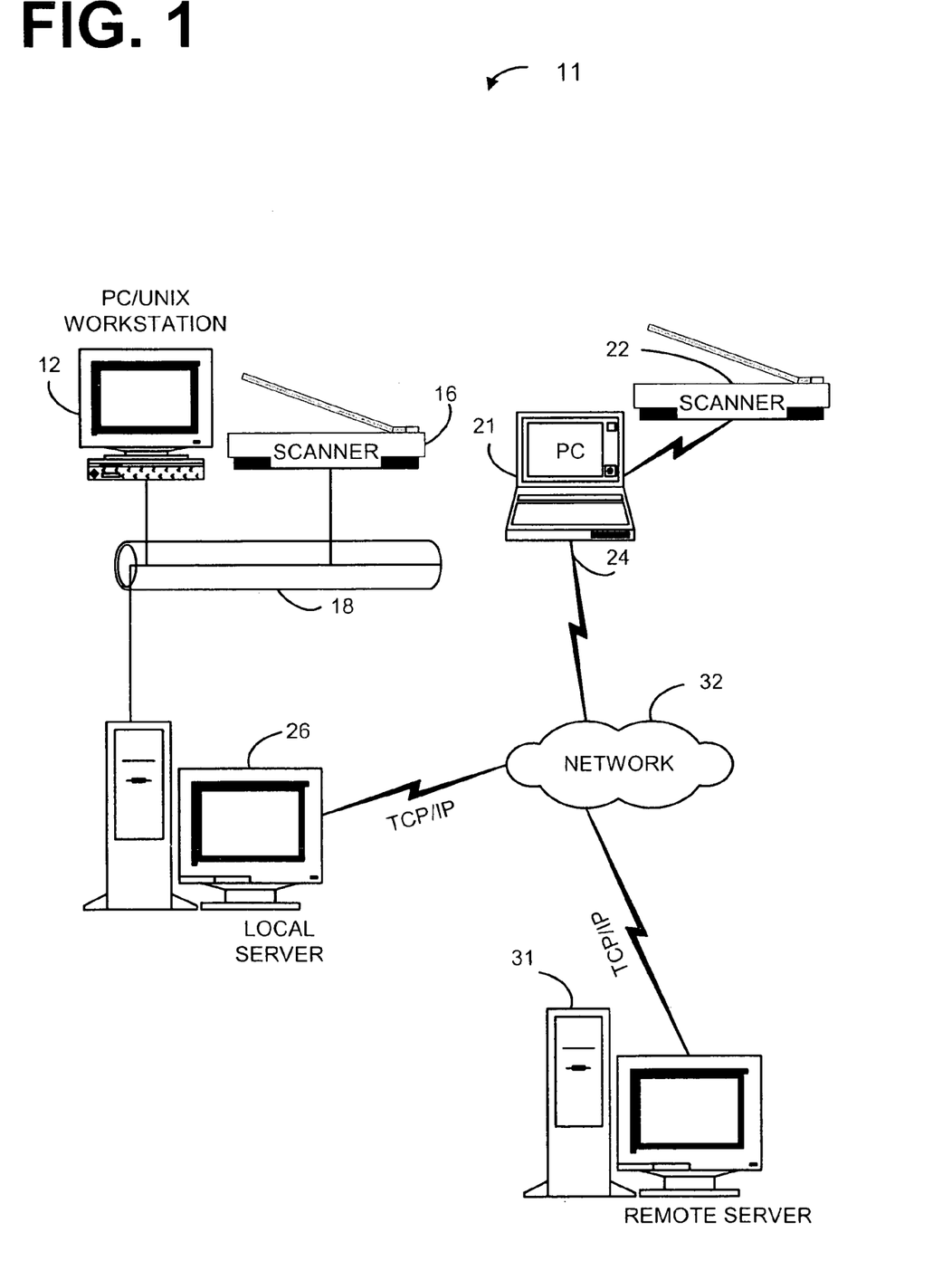
FIG. 1 is a block diagram of various possible scan systems of the present invention.

Turning now to the drawings, FIG. 1 is a block diagram of possible system configurations that illustrate the flexibility and platform independence of the present invention. While the scan system of the invention ca take many forms, the diagram of FIG. 1 illustrates a plurality of scan devices 16 and 22, that are directly connected to a network 32, for example, but not limited to, a dial-in, LAN, WAN, PSTN, Intranet and Internet communications links (18 and 24). Each of the scan systems in FIG. 1 is uniquely illustrated to emphasize that scan systems may be comprised of diverse hardware platforms.

As can be seen from FIG. 1, the scan systems may be comprised of a scanner 22 that is connected to a computer 21. This allows the computer 21 to execute a scan system that interacts with scanner 22.

It is also illustrated in FIG. 1 that a stand-alone scanner 16 may be directly connected to a local server 26 via a communication link 18. Network 18 may be, for example, an Ethernet type network (e.g., 10 BASE 2, 10 BASE 5, 10 BSAF, 10 BASE-T, base band network, a coaxial cable, a dial-in, LAN, WAN, PSTN, Intranet or Internet.

Figure 2:
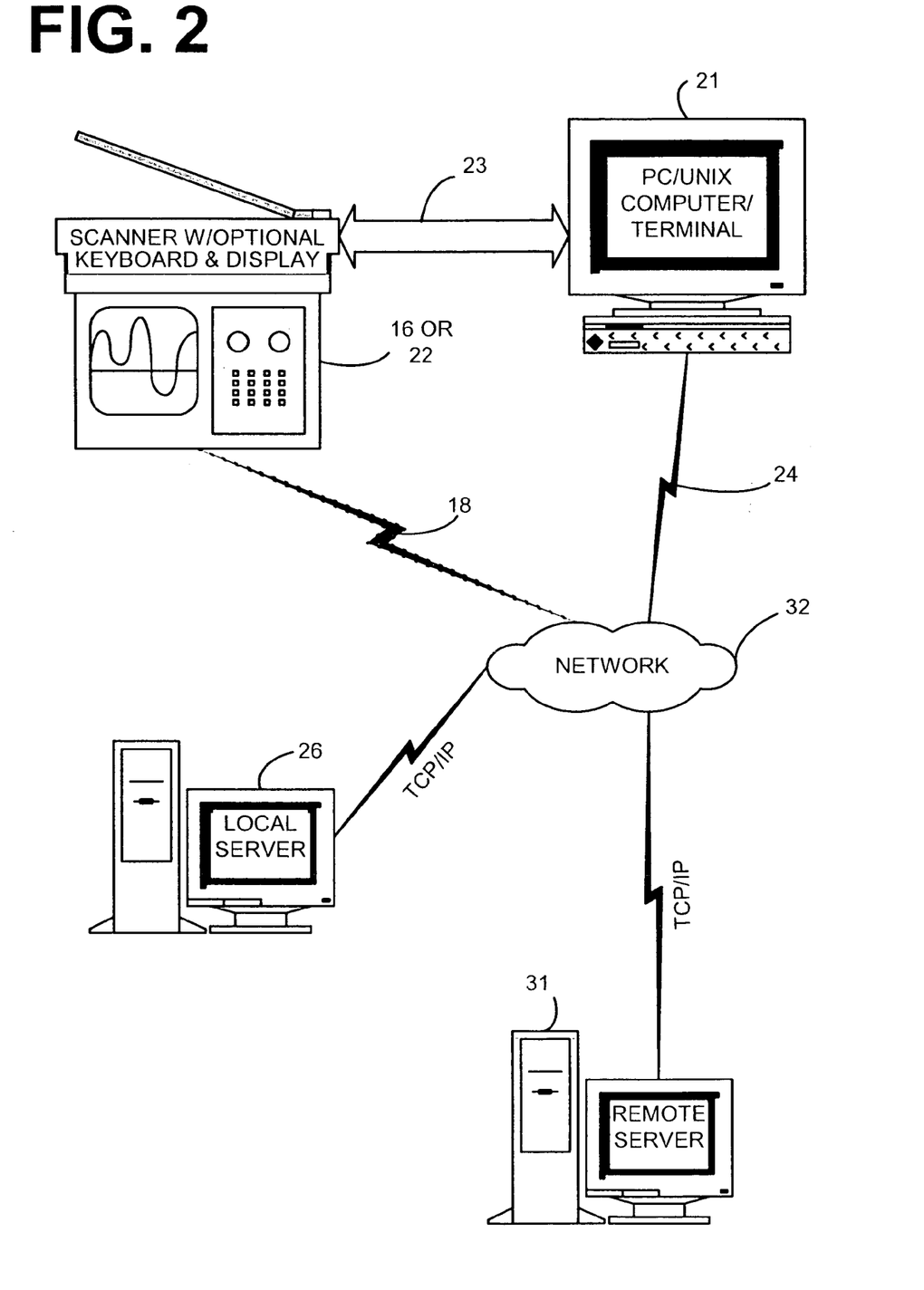
FIG. 2 is a block diagram further illustrating in greater detail the possible scan systems of the present invention.

Illustrated in FIG. 2 is a more detailed figure showing that a scanner 16 may be connected directly to a user computer 21 or with an optional keyboard and display directly connected via a link 18 to a network 32. The stand-alone scanner 16 includes the scan system 100 that is specifically designed to operate on stand-alone scanner systems.

Some stand-alone scanners 16 can provide for scanned documents or images directly to a LAN, WAN, Intranet or Internet, local server site 26 or remote server site 31. The stand-alone scanner 16 may include a keypad and a limited display. In those instances where the stand-alone scanner 16 does not include an optional keypad or display, the user presets the destination network site. The identification of this preset destination network site can be downloaded via the communication links 18 or 23, or programmed utilizing standard methods.

Figure 3A:
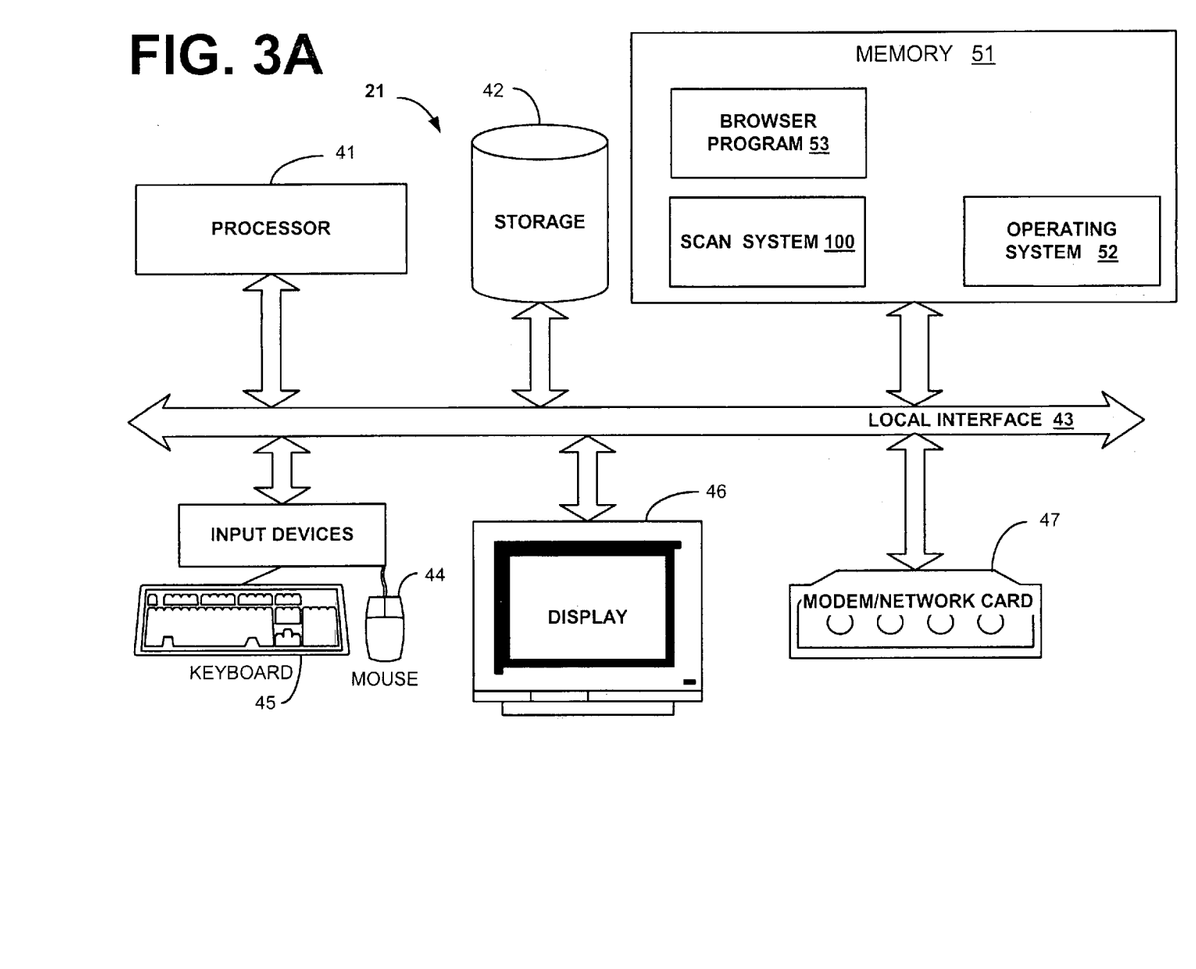
FIG. 3A is a block diagram illustrating a scan system of FIGS. 1 and 2, and a browser program situated within a computer readable medium, for example, in a user computer system that is used in connection with the scan system.

As illustrated in FIG. 3A, a computer system that employs the scan system 100 may also include a browser program 53 (e.g., Netscape, Internet Explorer, or other browser type program) for use in accessing locations on a network 32. The browser program 53 provides for a variety of hardware platforms. Browsers are most commonly recognized for their utility for accessing information over the Internet 32. A browser is a device or platform that allows a user to view a variety of service collections.

In the example illustrated, the browser program 53 retrieves information from a remote server 31 or local server 26, using HTTP. The browser program 53 then interprets HTML code, formats the code, and displays the interpreted result on a workstation display, such as display 46. The browser program 53 resides in computer memory 51 and accesses communication facilities modem 47 to bring resources from the network 32 to the user's browser using the modem. In order to find a resource, the user should know the network location (i.e., site) of the resource denoted by a network location identifier or URL. These identifiers are often cryptic, following very complex schemes and formats in their naming conventions.

Computer systems identify, access, and process these resources desired by a user by using the processor 41, storage device 42, and memory 51 with an operating system 52 and browser program 53. The processor accepts data from memory 51 and storage 42 over the local interface 43, for example, one or more buses. Direction from the user can be signaled by using one or more input devices, for example, mouse 44 and keyboard 45, as well as by actuating a pushbutton on the front of the scanner itself. The actions input and result output are displayed on the display terminal 46. Also illustrated in FIG. 3A is the scan system 100 of the present invention situated in a user's computer system 12. This scan system 100 will be further explained hereafter with regard to FIGS. 4–6.

Figure 3B:
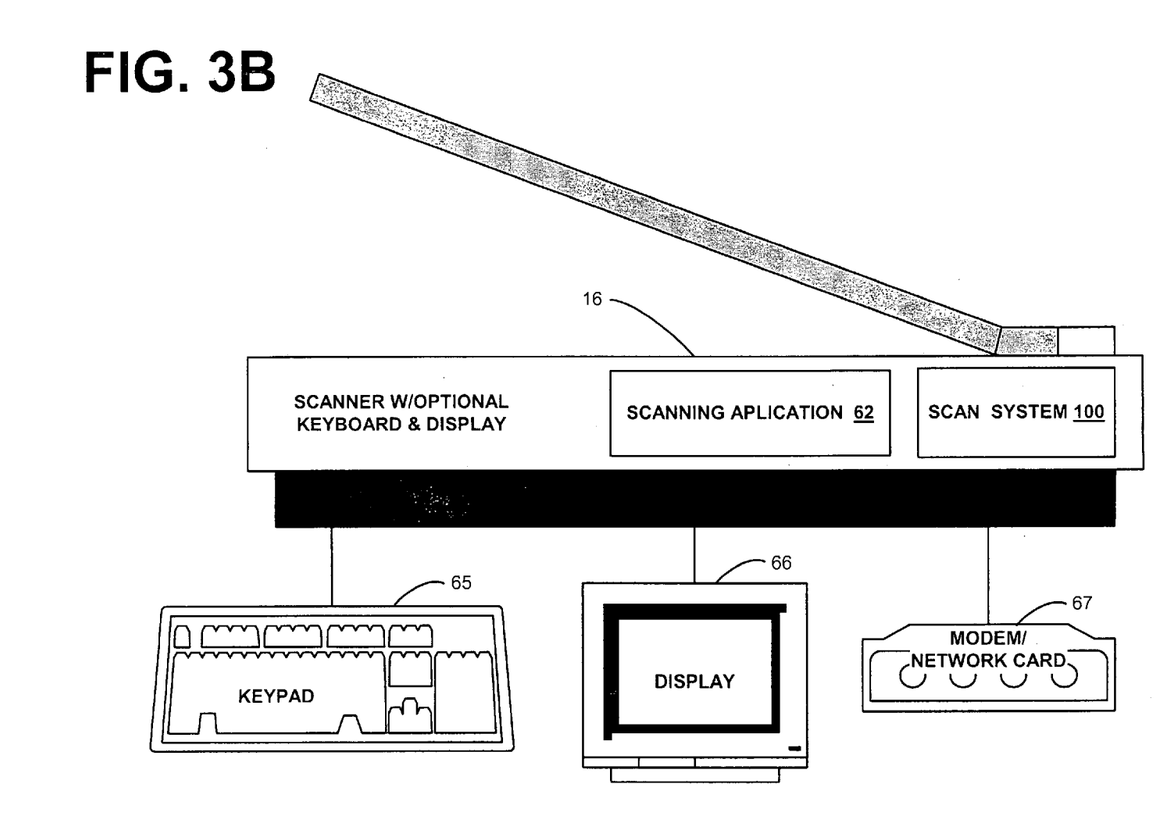
FIG. 3B is a block diagram illustrating the scan system of FIGS. 1 and 2 situated within a stand-alone scanner.

Illustrated in FIG. 3B is a block diagram of a stand-alone scanner 16 including the scanning application 62. Scanner 16 usually includes a processor (not shown) and a memory (not shown) that utilizes a scanning application 62 to control the scanner and an optical input device (not shown). The processor accepts data from the optical input device and memory over a bus (not shown). Direction from the user can be signaled by using the input devices such as a keypad 65, as well as by actuating a pushbutton (not shown) on the front of the scanner itself. The actions input and result output may be displayed on the optional display terminal 66. The stand-alone scanner 16 also includes a modem or network card 67 to establish communication with the remote server 31 on network 32. Scanner 16 can also be implemented utilizing non-processor circuitry.

Also illustrated in FIG. 3B is the scan system 100 of the present invention situated in the stand-alone scanner 16. This scan system 100 resides in hardware, software or firmware of the stand-alone scanner 16. The scan system 100 will be further explained hereafter with regard to FIGS. 4–6.

Figure 4:
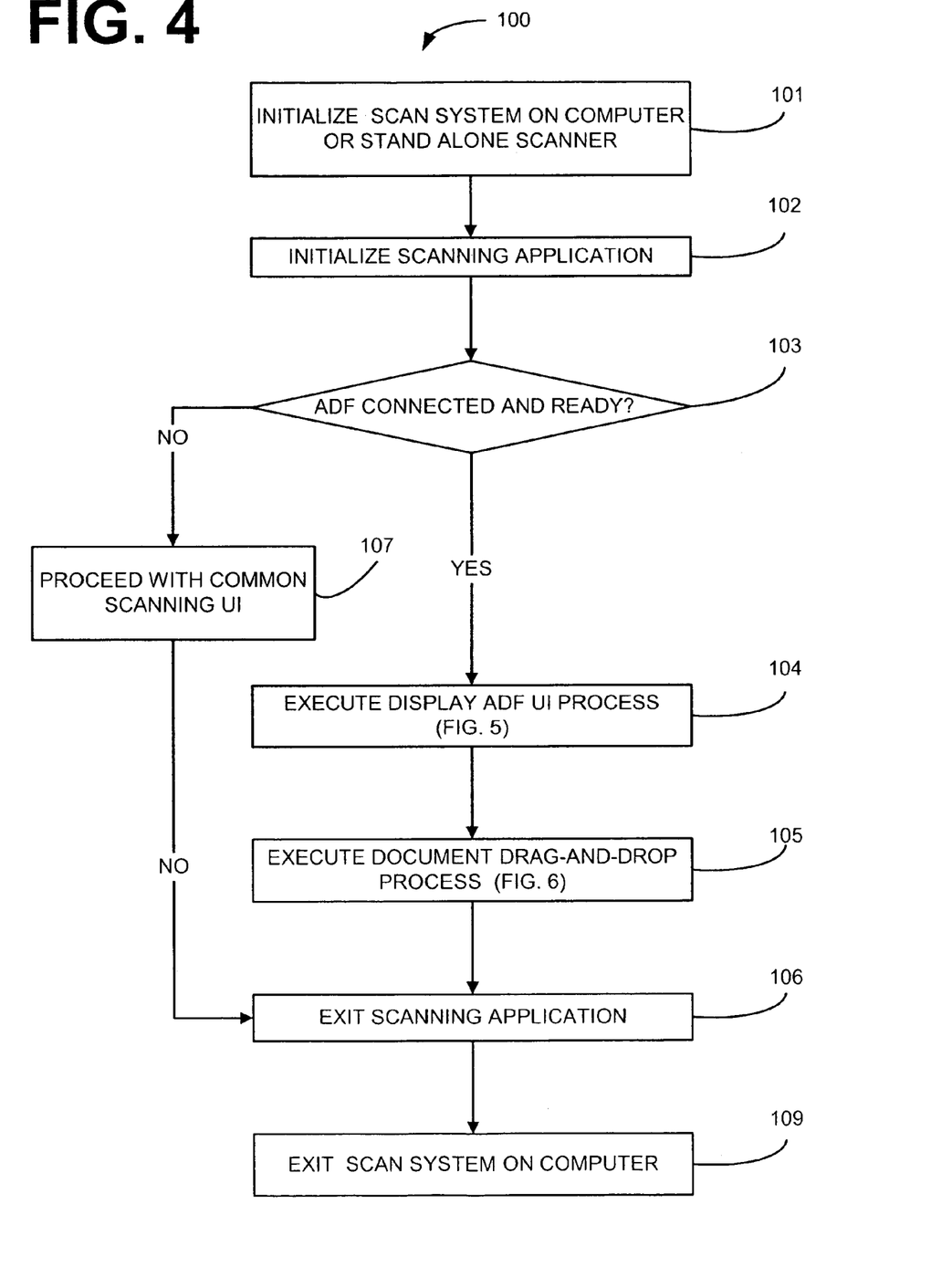
FIG. 4 is a flow chart of the scan system for the user computer system or stand-alone scanner of the present invention, as shown in respective FIGS. 3A and 3B.

With regard to FIG. 4, illustrated is an example of a scan system 100 executing on a computer system 12 or stand-alone scanner 16. The first step of scan system 100 is to initialize itself at step 101. If the scan system 100 is implemented using a browser program 53 (FIG. 3A), scan system 100 is initialized in that environment. The scan system 100 then directs the scanner 16 or 22 to initialize the scanning application 62 (FIG. 3B) at step 101. The scanning application 62 is the general purpose scanning software that enables a scanning system 16 or 22 to acquire a digitized image. The scanning application 62 is utilized to control the scanner and the optical input device to create the digitized image.

At step 103, the scan system 100 determines whether an automatic document feeder (ADF) is connected and ready. If it is determined at step 103 that the ADF is not connected or is not ready, the scan system 100 then proceeds to step 107 to proceed with the common scanning user interface of the scanning application 62. If it is determined at step 103 that the ADF is connected and ready, the scan system 100 executes the display ADF user interface process at step 104. The display ADF user interface process is herein defined in further detail with regard to FIG. 5.

After execution of the display ADF user interface process 104, the scan system 100 then executes the document drag and drop process at step 105. The document drag and drop process is herein defined in further detail with regard to FIG. 6. After executing the document drag and drop process at step 105, the scan application is terminated on the scanner system at step 106. At step 109, the scan system 100 exits from the stand alone scanner or on the computer.

Figure 5:
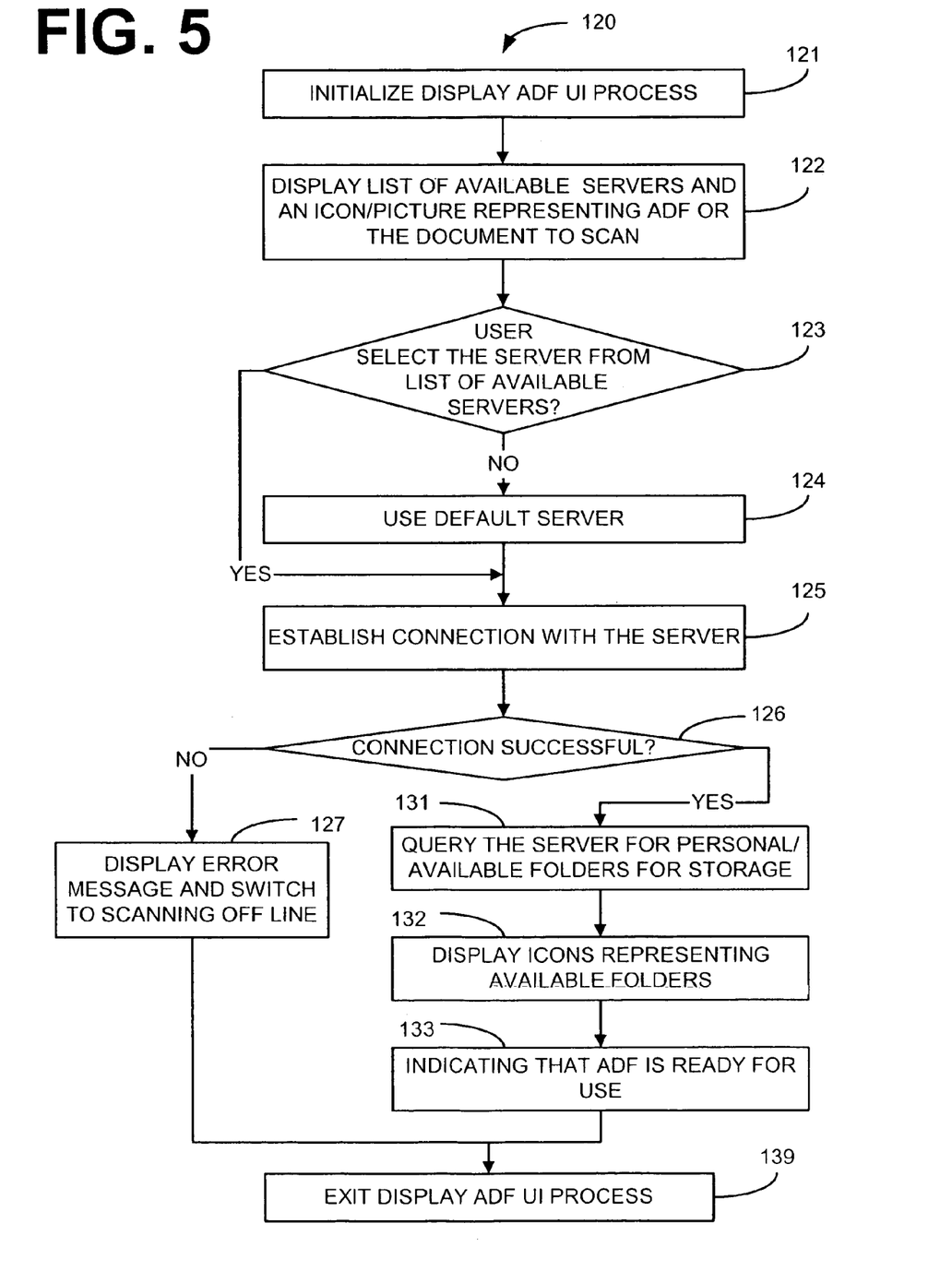
FIG. 5 is a flow chart of the automatic document feeder user interface process for the scan system of the present invention, on both the computer-controlled and stand-alone scanner, as shown in FIG. 4.

Illustrated in FIG. 5 is a flow diagram example of the display user interface process 120. The display user interface process 120 is first initialized at step 121. At step 22, the display user interface process 120 displays a list of available servers, and an icon or picture representing the automatic document feeder or the document image to be scanned. The list of available servers can be either a text list in a graphical user interface system or can comprise icons representative of the available destination servers.

At step 123 the display user interface process 120 then determines whether the user has chosen a server from the available list of servers. If it is determined at step 123 that the user has not chosen a server from the list of available servers, the display user interface process 120 then utilizes the default server as the destination location at step 124. After setting up the default server or if the user did select a server from the list of available servers, the display user interface process 120 then establishes a connection at step 125, with either the selected server, or if no server was selected at step 123, the default server.

Next, at step 126, the display user interface process 120 determines whether the connection to the destination server attempted at step 125 was completed successfully.

If the attempt to connect to the server at step 125 was not successful, the display user interface process displays an error message and switches to scanning off-line at step 127. After displaying the error message, the display user interface process 120 exits at step 139.

If it is determined at step 126 that the connection attempted at step 125 was successful, the display user interface process 120 then queries the destination server for any personal and available folders for storage at step 131. At step 132, the display user interface process 120 displays the icons representing available folders. At step 133, the display user interface process 120 indicates that the automatic document feeder is ready for use. The display user interface process 120 then exits at step 139.

Figure 6:
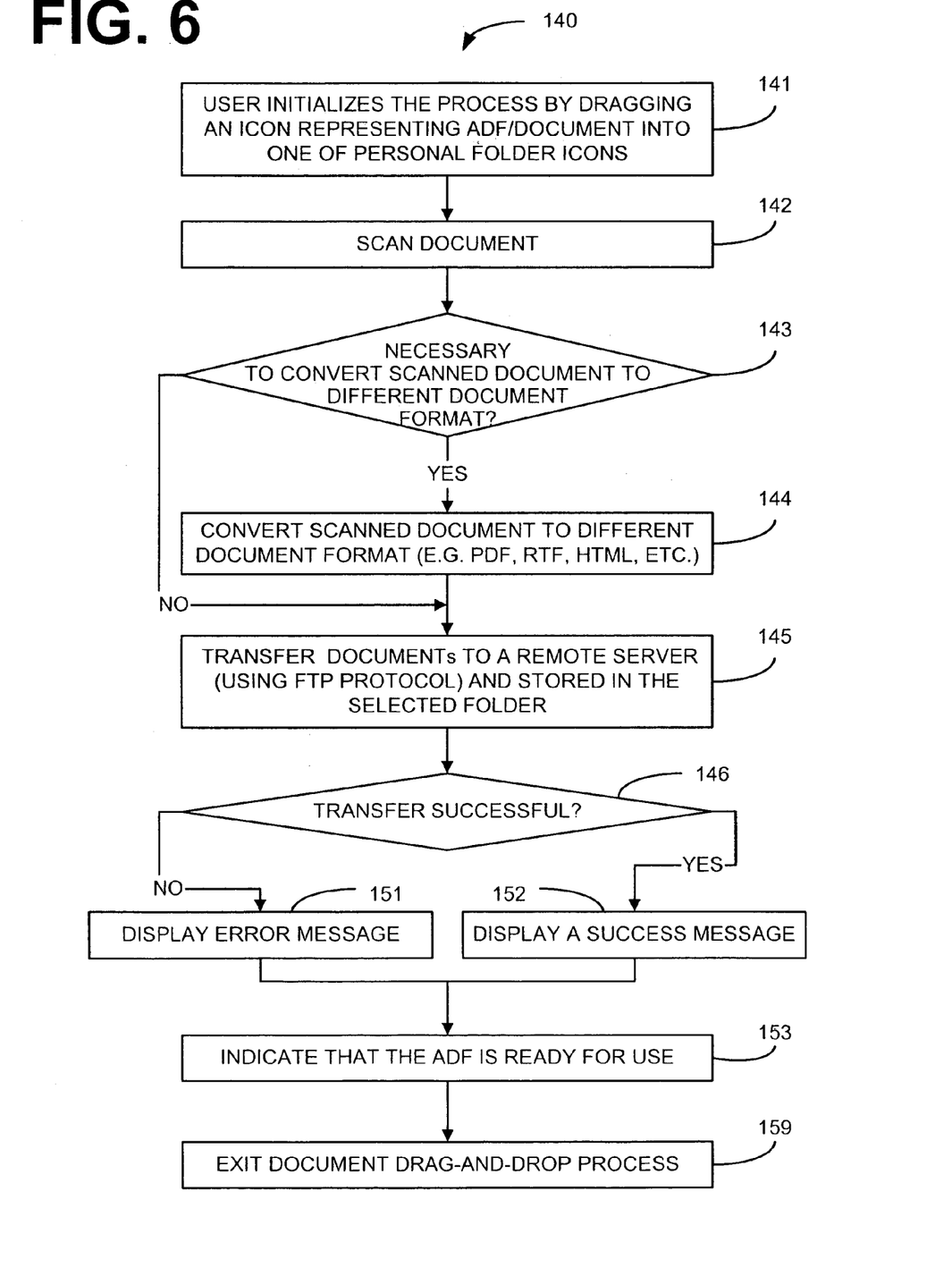
FIG. 6 is a flow chart of the document drag-and-drop process for the scan system of the present invention, on both the computer-controlled and stand-alone scanner, as shown in FIG. 4.

Illustrated in FIG. 6 is an example of a flow diagram of the document drag and drop process 140. First, at step 141, the user initializes the document drag and drop process 140 by dragging an icon representing the automatic document feeder or document into one of the personal folder icons. The icons representing the automatic document feeder or documents were previously displayed at step 132 (FIG. 5). At step 142, the document drag and drop process 140 then commands the scanner to scan the document.

At step 143, it is determined whether it is necessary to convert the scanned document or image into a different document format. If it is not necessary to convert the scanned document into a different document format type, the document drag and drop process 140 proceeds to step 145. If it is necessary to convert the scanned document into a different document format, the document drag and drop process 140 converts the scanned document to the different document format at step 144.

Next, the document drag and drop process 140 transfers the scanned document to a remote server at step 145. This transfer preferably utilizes the FTP protocol to transfer the document, however, other methods of transferring the document are feasible. After transferring the document to the remote server at step 145, the documents are then stored in the selected folder. At step 146, the document drag and drop process 140 determines whether the transfer was successful. If the transfer at step 145 was successful, the drag and drop process 140 displays a transfer success message at step 152. If the transfer attempted at step 145 was determined not to be successful, the document drag and drop process 140 then displays a transfer error message at step 151.

After displaying either a transfer error or success message at step 151 and 152, respectively, the document drag and drop process 140 then displays a message indicating that the ADF automatic document feeder is now ready for continued use at step 153. The display message preferably utilizes the scrolling text to display the message, however, other methods of displaying the message are feasible. The document drop and drag process 140 then exits at step 159.

The previously defined flow charts show the architecture, functionality, and operation of a possible implementation of scan system 100 for scanning images to a remote location. In the preferred embodiment, the scan system 100 comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In this regard, each block represents a module, segment, or portion of code, which comprises one or more executable instructions for implementing the specified logical function (s). It should also be noted that in some alternative implementations, the functions noted in the blocks may occur out of the order. For example, blocks shown in succession may in fact be executed substantially concurrently or the blocks may sometimes be executed in the reverse order, depending upon the functionality involved, as described herein above.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method of transferring an image to a destination, the method comprising:
   accessing, by a standalone scanner, at least one network device over a network;
   displaying destination options on a user interface of the standalone scanner based on accessing the at least one network device;
   obtaining said destination based on selection of the destination options in said user interface, wherein said destination is connected to said standalone scanner using said network;
   performing scanning on said standalone scanner to produce said image; and
   transferring said image to said destination.

2. The method of claim 1, wherein said user interface comprises a browser.

3. The method of claim 1, wherein said obtaining said destination comprises detecting a drag and drop operation wherein a first icon is dragged to a location indicator and dropped on said location indicator.

4. The method of claim 3, wherein said first icon comprises a scanner icon.

5. The method of claim 1, further comprising automatically converting said image to a different document format before storing said image.

6. The method of claim 1, wherein accessing the at least one network device by the standalone scanner comprises accessing the at least one network device by a scanner that operates independently of a computer.

7. The method of claim 1, wherein displaying the destination options comprises displaying icons representing folders on the at least one network device, and wherein obtaining the destination based on selection in the user interface comprises selecting one of the folders based on a drag-and-drop operation that selects the one of the folders.

8. The method of claim 7, wherein selecting one of the folders based on the drag-and-drop operation comprises selecting one of the folders based on drag and dropping a first icon to an icon representing the one of the folders, the first icon representing one of an automatic document feeder and a document.

9. The method of claim 1, wherein the accessing, displaying, and transferring is performed by a browser.

10. The method of claim 1, further comprising:
displaying a list of servers in the user interface;
receiving selection of one of the servers,
wherein accessing the at least one network device comprises querying the selected one of the servers.

11. An apparatus for controlling an image scanning process in a standalone scanner, comprising:
at least one computer readable medium; and
computer readable program code stored on said at least one computer readable medium, said computer readable program code being executable on said standalone scanner to:
query at least one network device over a network for folders;
display icons representing the folders in a user interface of the standalone scanner; and
in response to a first displayed element associated with the standalone scanner being dragged to and dropped upon a selected one of the icons,
causing said standalone scanner to perform a scan to produce at least one image; and
transferring said at least one image from said standalone scanner to a folder associated with the selected one of the icons.

12. The apparatus of claim 11, wherein said computer readable program code is executed without further user intervention after said first displayed element is dragged to and dropped upon said selected icon.

13. The apparatus of claim 11, wherein said first displayed element comprises a scanner icon.

14. The apparatus of claim 11, wherein said user interface comprises a browser.

15. The apparatus of claim 11, said computer readable program code further executable to convert said at least one image to a different document format before said transferring.

16. The apparatus of claim 11, wherein said transferring comprises transferring said at least one image across a File Transfer Protocol (FTP) connection.

17. The apparatus of claim 11, wherein the standalone scanner comprises a scanner that operates independently of a computer.

18. The apparatus of claim 11, wherein the computer readable program code is executable to:
present available servers in the user interface of the standalone scanner; and
receive selection of one of the servers as the network device.

19. The apparatus of claim 11, wherein the computer readable program code comprises a web browser, the web browser executable to perform the querying and displaying.

20. A standalone scanner connectable to a network, the standalone scanner comprising:
a processor;
a memory coupled to the processor;
a browser program stored in the memory for accessing a network device on the network;
a display for displaying destination locations on the network device; and
a user interface to enable selection of one of the destination locations and for causing the standalone scanner to perform a scan to produce an image and automatically send the image to the selected one of the destination locations on the network device.

21. The standalone scanner of claim 20 wherein the network is the internet.

22. The standalone scanner of claim 20 wherein the scanner is directly connected to a local server via a communication link for sending the image to the local server and then the selected one destination location.

23. The standalone scanner of claim 20 further comprising a network card to establish communication to the network device on the network.

24. The standalone scanner of claim 20 further comprising an automatic document feeder (ADF).

25. The standalone scanner of claim 20 wherein the display displays a list of available servers as icons, the user interface to enable selection of one of the servers as the network device.

26. The standalone scanner of claim 20, wherein the destination locations comprise folders, and selection of the one of the destination locations comprises selection of one of the folders.

27. A method of software execution in a standalone scanner, comprising:
querying at least one network device over a network for folders;
displaying icons representing the folders in a user interface of the standalone scanner;
receiving selection of one of the icons in the user interface;
in response to the selection of one of the icons, causing said standalone scanner to perform a scan to produce at least one image; and
transferring said at least one image from said standalone scanner to a folder associated with the selected one of the icons.

28. The method of claim 27, wherein receiving selection of the one of the icons comprises receiving selection based on dragging and dropping a displayed element representing an automatic document feeder to the selected one of the icons.

* * * * *